May 2, 1939.  W. S. ADAMS  2,156,796
METALLIC PACKING FOR PISTONS
Filed Dec. 29, 1937
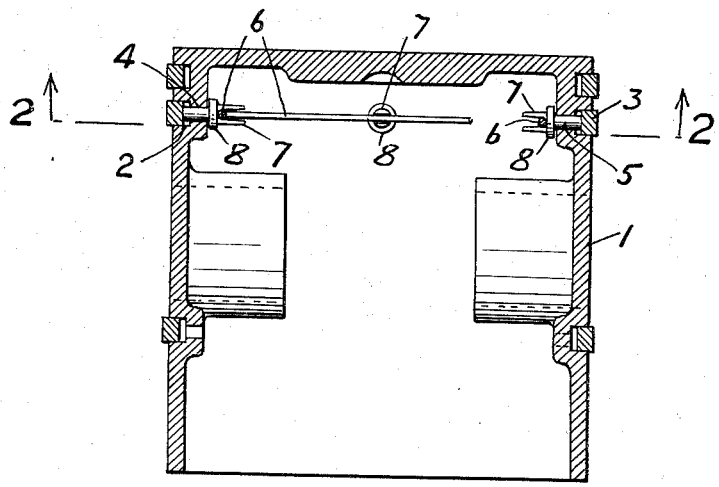
FIG. 1.
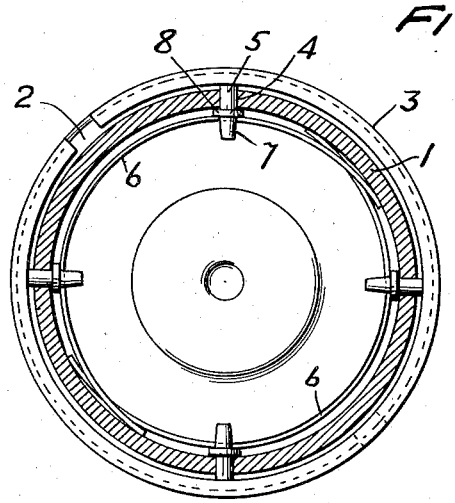 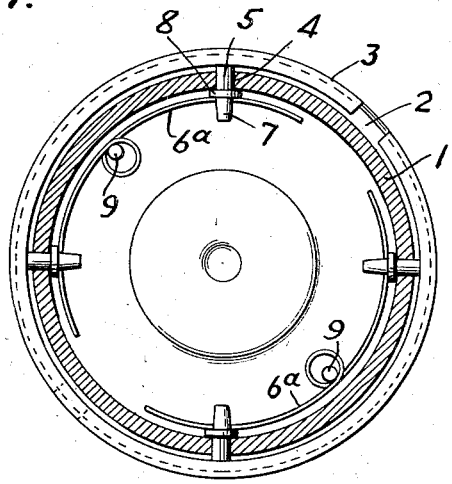
FIG. 2.  FIG. 3.
WITNESS:
INVENTOR
William Smiley Adams
BY
Augustus B Broughton
ATTORNEY.

Patented May 2, 1939

2,156,796

UNITED STATES PATENT OFFICE 2,156,796

METALLIC PACKING FOR PISTONS

William Smiley Adams, Philadelphia, Pa.

Application December 29, 1937, Serial No. 182,176

2 Claims. (Cl. 309—43)

Spring expanders for the packing rings of internal explosion or combustion engines having hollow pistons to the interior of which lubricating oil is supplied or sprayed possess the possibility, known to those skilled in the art, of greatly improving the performance of the engine in respect to operation, economy and durability; for example, the piston is properly centered in the cylinder at all times and the rings are properly held up to the cylinder wall, thus avoiding slow combustion and so called "blow-by" and combustion of lubricating oil with high heating and deposition of hard carbon; and ensuring proper compression; also drag is avoided and proper sledding or sliding action of the piston is ensured and uneven wear and leakage are avoided.

Although attempts to realize these and other possibilities have been made, they have not succeeded in practice and have resulted in failure. This invention is based upon the discovery of the cause of these failures and it consists in the provision of means for overcoming them.

Generally stated, the invention comprises a hollow piston having a groove and a packing ring which may be of full size and provided with a piston ring expander mechanism hereinafter more fully described and of which the surface of working parts inside the piston is exposed to direct contact with lubricating oil supplied within the piston and which cools and packs the same, thereby avoiding the deposition of carbon and keeping the mechanism free to operate continuously.

The invention also comprises the improvements to be presently described and finally claimed.

In the following description reference will be made to the accompanying drawing forming part hereof and in which, Figure 1 is a transverse sectional view of a hollow piston embodying features of the invention.

Figure 2 is a sectional view taken on the line 2—2 of Figure 1, and

Figure 3 is a view similar to Figure 2 illustrating a modification.

Referring to the drawing, 1 indicates a hollow piston having the usual crank pin element and having a groove 2 in which is arranged a packing ring 3. The packing ring may be of full or standard size. Of course, there may be more than one groove and packing ring. However, in the drawing my invention is shown in application to only one of the packing rings, but it must be understood that it can be applied to any or all of them. The packing ring 3 is of standard or preferred construction and as shown it is split and made of spring metal as is customary. It is a feature of the expander mechanism that the surface of its working parts is directly exposed to the lubricating oil that is supplied or sprayed into the interior of the hollow piston 1. To this end holes 4 are bored through the curved wall of the cylinder and endwise movably mounted in these holes are plungers 5. The surface of the inner end of these plungers is directly exposed to the lubricating oil sprayed or supplied inside the hollow cylinder and the lubricating oil also reaches the stems of these plungers and facilitates their movement in respect to the surface that bounds the holes 4 in the piston wall. There are springs which press upon the inner ends of the plungers and tend to move them outward radially and with them the packing ring 3 into contact with the wall of the cylinder in which the piston works. As shown in the drawing, there are four plungers 5 but the number may be increased and diminished. Referring to Figure 2, the springs 6 are shown to be arcuate and each extends more than half way around the interior of the piston wall and each operates upon two plungers. As shown in the drawing the springs operate in notches 7 in the inner ends of the plungers and the plungers are shown with heads 8 which are convenient in assembling the structure. It will, of course, be understood that when the piston is in the cylinder the ring 3 is contracted in respect to the showing in the drawing and the heads 5 are, therefore, nearer to the axis of the piston than they appear to be in the drawing. Referring to Figure 3 the springs 6ª each operate upon two plungers as described but they are supported by posts 9 carried by the head of the piston and near the wall thereof. Upon reference to the drawing it will be noted that the springs are bow springs and are supported comparatively far from the center of the piston head and near to the rim of the piston head. By this construction the vibration imparted to the springs by the rapid reciprocations of the piston is minimized. Again it will be noted that the portions of the springs beyond their supports are not unduly heavy and this construction also tends to avoid excessive vibration. Moreover the guided connection exemplified by the notches 7 ensures that the springs remain in operative position in respect to the inner ends of the plungers, notwithstanding the tendency of the springs to turn away from contact with the inner ends of the plunger, which tendency is due to rapid reciprocations of the piston. Attention has been directed to the fact that the heads 8 are useful in assembling the structure, but they are also useful because they prevent the plungers from entering the space between the ends of a packing ring and scoring the cylinder walls. The springs are arranged inside the hollow piston with their surfaces exposed to lubricating oil. It is a feature of the described construction that there is no obstruction interposed inside the piston which prevents lubricating oil from reaching the surface of working parts of the expander mechanism, nor is there any obstruction which prevents carbon reaching the expander mechanism from passing through the hollow piston into the crank case. Thus the expander mechanism cooled by the lubricating oil and free from carbon deposit continues to perform its function throughout a long period of time, comparable with the life of the engine. During this long life the expander mechanism keeps the piston central of the cylinder, ensures a sliding or skidding movement of the piston and satisfactorily packs the engine so that proper compression is obtained and quick explosion as distinguished from prolonged combustion is ensured. However, if so called "blow-by" should occur or if carbon should result from the decomposition or cracking of lubricating oil the carbon is not deposited upon the surface of the working parts of the expander mechanism but passes out of the hollow piston into the crank case. From this it follows that the expander mechanism is free to act continuously and this is ensured by the free access of the lubricating oil directly to the surface of its working parts and to the fact that the expander mechanism, including the springs, are kept cool and free from carbon and gum and products of decomposition of oil.

It will be obvious to those skilled in the art to which the invention relates that modifications may be made in details of construction and in matters of mere form without departing from the spirit of the invention which is not limited to such matters or otherwise than as the prior art and the appended claims may require.

I claim:

1. A hollow piston having a crank pin element and having a split packing ring and groove and provided with an expander mechanism comprising plungers arranged and extending through the piston wall and working on the same packing ring, floating arcuate bow springs acting on the plungers in pairs and constituting separate elements from the plungers and disposed inside the piston and supported in proximity with its periphery and remote from the center of its head, the support for the springs consisting of posts disposed diametrically opposite the crank pin element and mounted in the piston head and around which the springs are loosely coiled, and the portions of each spring adjacent to and on each side of a post arranged to operate respectively on one of the plungers, and means for maintaining the springs in sliding contact with the inner ends of the plungers, and the surfaces of said expander mechanism being directly exposed inside the piston to lubricating oil.

2. A hollow piston having a packing ring and a groove and provided with an expander mechanism comprising plungers arranged and extending through the piston wall and working on the same packing ring, floating arcuate bow springs acting on the plungers in pairs and constituting separate elements from the plungers and disposed inside the piston and movably supported in proximity with its periphery and remote from the center of its head, the portions of the spring adjacent its support being free to act respectively on one plunger, and notches at the inner ends of the plungers for maintaining the springs in sliding contact with the inner ends of the plungers, surfaces of said expander mechanism being directly exposed inside the piston to lubricating oil.

WILLIAM SMILEY ADAMS.